(12) United States Patent
Keller et al.

(10) Patent No.: US 11,813,989 B2
(45) Date of Patent: Nov. 14, 2023

(54) HOLDER FOR DETACHABLY FASTENING A FLAT DEVICE TO A MOTOR VEHICLE SEAT

(71) Applicant: Kinetix AG, Chur (CH)

(72) Inventors: Michael Andreas Keller, Freudenstadt (DE); Wojtek Dyczka, Simmersfeld-Oberweiler (DE); Jürgen Heidinger, Munich (DE); Peter Spang, Waldachtal (DE)

(73) Assignee: Kinetix AG, Chur (CH)

( * ) Notice: Subject to any disclaimer, the term of this patent is extended or adjusted under 35 U.S.C. 154(b) by 0 days.

(21) Appl. No.: 17/734,609

(22) Filed: May 2, 2022

(65) Prior Publication Data

US 2022/0355744 A1 Nov. 10, 2022

(30) Foreign Application Priority Data

May 5, 2021 (DE) ...................... 20 2021 102 428.3

(51) Int. Cl.
*B60R 11/02* (2006.01)
*B60R 11/00* (2006.01)

(52) U.S. Cl.
CPC ........... *B60R 11/02* (2013.01); *B60R 11/0241* (2013.01); *B60R 2011/0015* (2013.01); *B60R 2011/0085* (2013.01)

(58) Field of Classification Search
CPC . B60R 11/02; B60R 11/0241; B60R 11/0252; B60R 2011/0276;

(Continued)

(56) References Cited

U.S. PATENT DOCUMENTS 6,418,010 B1 * 7/2002 Sawyer ................. F16M 11/14
361/801
6,464,185 B1 * 10/2002 Minelli ............. F16M 11/2064
248/920

(Continued)

FOREIGN PATENT DOCUMENTS

CN 106494283 A * 3/2017 ............ B60R 11/02
CN 106671890 A * 5/2017

(Continued)

OTHER PUBLICATIONS

Search Report from German Priority Application No. 20 2021 102 428.3 dated Jan. 24, 2022.

*Primary Examiner* — Justin M Larson
(74) *Attorney, Agent, or Firm* — Dilworth & Barrese, LLP

(57) ABSTRACT

The invention relates to a holder (10) for detachably fastening a flat, approximately rectangular device—such as a tablet computer or a smartphone—to a motor vehicle seat (20), wherein the holder has a fastening device (12) for the detachable plug-in fastening of the holder to a plug-in receptacle (18) allocated to the motor vehicle seat, and wherein the holder has a holding device (24) for detachably holding the device to the holder, wherein the fastening device and the holding device are connected to one another via a coupling element (36), wherein the coupling element is connected to the fastening device via a first joint and to the holding device via a second joint, wherein the joints are designed as swivel joints with a first swivel joint (42) and a first swivel axis (38) and with a second swivel joint (44) and a second swivel axis (40), wherein the first swivel axis and the second swivel axis are oriented parallel to one another.

13 Claims, 5 Drawing Sheets

Figure 1:
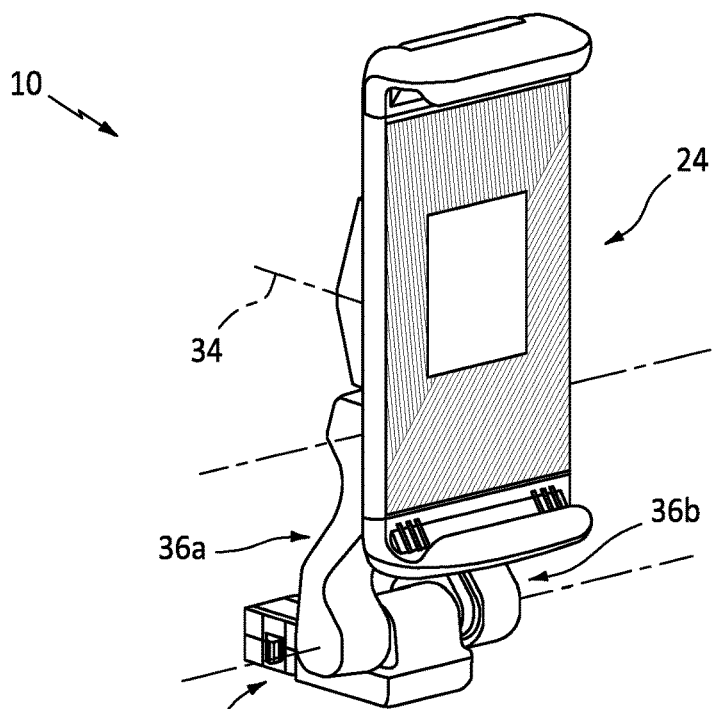

(58) Field of Classification Search
CPC ..... B60R 2011/0085; B60R 2011/0015; B60R 2011/0087; B60R 2011/0089
See application file for complete search history.

(56) References Cited

U.S. PATENT DOCUMENTS

| | | | | |
|---|---|---|---|---|
| 8,881,659 | B2* | 11/2014 | Ackeret | B60N 3/004 |
| | | | | 297/188.2 |
| 9,278,648 | B2* | 3/2016 | Ackeret | B60R 7/04 |
| 9,527,456 | B2* | 12/2016 | Ackeret | B60R 11/0241 |
| 10,059,277 | B2* | 8/2018 | Ackeret | B60R 11/00 |
| 10,448,533 | B2* | 10/2019 | Maisenbacher | H05K 7/1401 |
| 10,471,902 | B2* | 11/2019 | Fischer | G03B 17/561 |
| 10,668,867 | B2* | 6/2020 | Bury | H02J 50/90 |
| 10,875,467 | B2* | 12/2020 | Keller | H04M 1/04 |
| D955,319 | S * | 6/2022 | Ackeret | D12/415 |
| 11,458,907 | B2* | 10/2022 | Michel | F16B 5/0628 |
| 11,548,412 | B1* | 1/2023 | Roy | B60N 2/20 |
| 2012/0313404 | A1* | 12/2012 | Ackeret | B60N 3/002 |
| | | | | 297/163 |
| 2013/0200119 | A1* | 8/2013 | Ackeret | B60R 7/04 |
| | | | | 224/275 |
| 2015/0069195 | A1 | 3/2015 | Richter | |
| 2015/0329062 | A1* | 11/2015 | Ackeret | B60R 11/0241 |
| | | | | 248/220.22 |
| 2019/0329717 | A1 | 10/2019 | Bury | |
| 2022/0355744 | A1* | 11/2022 | Keller | B60R 11/02 |
| 2023/0050234 | A1* | 2/2023 | Spang | B60R 11/0241 |

FOREIGN PATENT DOCUMENTS

| | | | | |
|---|---|---|---|---|
| DE | 10244100 A1 * | 4/2004 | ......... | B60R 11/0235 |
| DE | 202007005661 U1 | 7/2007 | | |
| DE | 202009013607 U1 | 12/2009 | | |
| DE | 102012208909 A1 * | 11/2012 | ............ | B60N 3/004 |
| DE | 102016110522 A1 * | 3/2017 | | |
| DE | 102016102611 A1 | 8/2017 | | |
| DE | 102016120748 A1 | 5/2018 | | |
| EP | 2914458 B1 * | 10/2020 | ............ | B60N 3/002 |
| WO | 2011/101083 A1 | 8/2011 | | |
| WO | WO-2012160209 A1 * | 11/2012 | ............ | B60N 3/004 |

* cited by examiner

HOLDER FOR DETACHABLY FASTENING A FLAT DEVICE TO A MOTOR VEHICLE SEAT

This application claims priority to German Patent Application No. 20 2021 102 428.3 filed on May 5, 2021.

The invention relates to a holder for detachably fastening a flat, approximately rectangular device—such as a tablet computer or a smartphone—to a motor vehicle seat, wherein the holder has a fastening device for the detachable plug-in fastening of the holder to a plug-in receptacle allocated to the motor vehicle seat, and wherein the holder has a holding device for detachably holding the device on the holder, wherein the fastening device and the holding device are connected to one another via a coupling element, wherein the coupling element is connected to the fastening device via a first joint and to the holding device via a second joint.

A holder for electronic devices is known from DE 10 2016 102 611 A1, which has a plug-in attachment on the vehicle side and a holding device on the device side. An articulated region is provided between the plug-in attachment of the holding device, with a swivel axis around, which an inclination of the holding device can be adjusted, and with a pivot joint, which serves to allow the same device to be oriented upright or transversely.

The holder known from DE 10 2016 102 611 A1 is robust and practical and is suitable for the safe and convenient operation in a motor vehicle, in particular a rear seat compartment of a motor vehicle.

It has been found that holders of the type mentioned above are used in a variety of vehicle environments (from simple small cars to luxury vehicles) and by a variety of different users of different ages and different heights. The design of the devices to be held on the holding device also varies from smaller smartphones to larger tablet computers.

Proceeding from this, the present invention is based on the object of specifying a holder that is particularly suitable for different vehicle environments and different users.

This object is achieved with a holder of the type mentioned above according to the invention in that the joints are designed as swivel joints with a first swivel joint and a first swivel axis and with a second swivel joint and a second swivel axis, wherein the first swivel axis and the second swivel axis are oriented parallel to one another.

The holder according to the invention makes it possible to arrange the holding device with the device arranged thereon in a variety of different positions and locations. In particular, the holder according to the invention makes it possible to arrange the holding device with the device in the immediate vicinity of the motor vehicle seat or else in a space further away from the motor vehicle seat with a reduced distance from the user of the device. This is, for example, advantageous for vehicle situations in which a user with a smaller body size wishes to use a relatively small device, in particular if the holder is located in a vehicle with a large-size rear seat compartment.

In particular, it is preferred if the first swivel axis and the second swivel axis are oriented horizontally in a position of use of the holder. This ensures that movement of the components of the holder takes place in a vertical plane of movement that runs parallel to the longitudinal axis of the vehicle. If the holding device is located in a region further away from the motor vehicle seat and it is assumed that the motor vehicle is involved in a rear-end collision, the holding device and the coupling element can move forward within the specified plane of movement, so that the risk of injury to a vehicle occupant who is also moving forward in the direction of the vehicle in the event of an accident is reduced. This also applies if the vehicle occupant is seated slightly offset from the holder in the transverse direction of the vehicle.

It is further preferred if the fastening device has a plug-in section extending along a plug-in axis, wherein the plug-in axis is oriented horizontally in the position of use of the holder and in a state inserted into the plug-in receptacle. This enables a simple and space-saving connection between the fastening device and the plug-in receptacle of the motor vehicle seat.

It is further preferred if a swivel path of the coupling element, starting from a vertical orientation of the coupling element, is limited to a first part of the swivel path in the direction of the motor vehicle seat of a maximum of 40°, and/or to an opposite second part of the swivel path of a maximum of 150°. The limitation in the region of the first part of the swivel path prevents an unintentional collision of the rear side of the holding device with components of the motor vehicle seat arranged above the plug-in receptacle, for example, a scratch-sensitive surface of a headrest or headrest casing. A limitation of the second part of the swivel path prevents such a collision in a region below the plug-in receptacle of the motor vehicle seat, for example, in the region of a cover or a casing of the backrest.

The preceding explanations regarding the regions of a motor vehicle seat refer to an arrangement of the plug-in receptacle in a region of a transition between a headrest and a backrest of a motor vehicle seat, in particular in the region of exposed headrest rods. However, the specified regions are for example only; it is understood that the plug-in receptacle can also be arranged in an integral seat, in which backrest regions and headrest regions merge into one another.

It is further preferred that, for limiting a first end position of one or the swivel path of the coupling element relative to the fastening device and/or for limiting a second end position of one or the swivel path of the coupling element relative to the fastening device, the coupling element and the fastening device are in abutment with one another. This enables a simple definition of the specified end positions through the simple contact of the specified components, wherein the components abut one another in particular in a region spaced apart from the first swivel axis.

According to a further embodiment of the invention, it is provided that a swivel angle of the holding device relative to the coupling element is at least 90°, preferably at least 120°, in particular at least 150°. This enables a substantially free inclination adjustment of the holding device about the second swivel axis, and preferably in each of the swivel positions of the coupling element relative to the fastening device.

It is further preferred if a swivel angle of the holding device relative to the coupling element does not exceed a maximum of 170°, which limits the adjustability of the inclination of the holding device to an adjustment range in which the holding device assumes an inclination in which a device held thereon is oriented approximately vertically, or points slightly downward, or points slightly upward. In particular, positions of the holding device can be avoided in which the holding device points substantially downwards and, in the event of unintentional release of the holding device, a device held thereon would fall downwards from the holding device.

For limiting a first end position of a swivel path of the holding device relative to the coupling element and/or for limiting a second end position of one or the swivel angle of the holding device relative to the coupling element, it is preferred if the holding device and the coupling element are in abutment with one another, in particular in a region spaced apart from the second swivel axis. This enables a reliable and stable definition of the first end position and/or the second end position.

It is further preferred if the first swivel joint and/or the second swivel joint is or are designed as friction joint(s). Such friction joints enable, in particular, the stepless adjustability of the coupling element relative to the fastening device or of the holding device relative to the coupling element.

In accordance with an additional form of the invention, the holder comprises a device for applying a torque to the coupling element about the first swivel axis, which torque is effective for erecting the coupling element from a horizontal position to a more vertically oriented position. The device thus exerts a holding force opposite to the force of gravity on the coupling element and on the holding device connected thereto, so that a weight balance can be created for a device held on the holding device. In conjunction with the use of a friction joint for the first swivel joint, this enables increased ease of movement of the friction joint and thus more convenient use of the holding device when adjusting a swivel position of the coupling element.

To further increase the comfort of the holder, it is proposed that the holding device has a pivot joint by means of which a holding region of the holding device is rotatable about a pivot axis that is oriented perpendicular to the second swivel axis. This makes it possible—in any position of the coupling element—to move the device held on the holding device together with the holding region optionally into an upright arrangement or into a transverse arrangement. For this purpose, it is preferred if the pivot joint has ratchet steps that are preferably offset by 90° relative to one another.

Further features and advantages of the invention are the subject of the following description and the graphic representation of a preferred embodiment.

Figure 2:
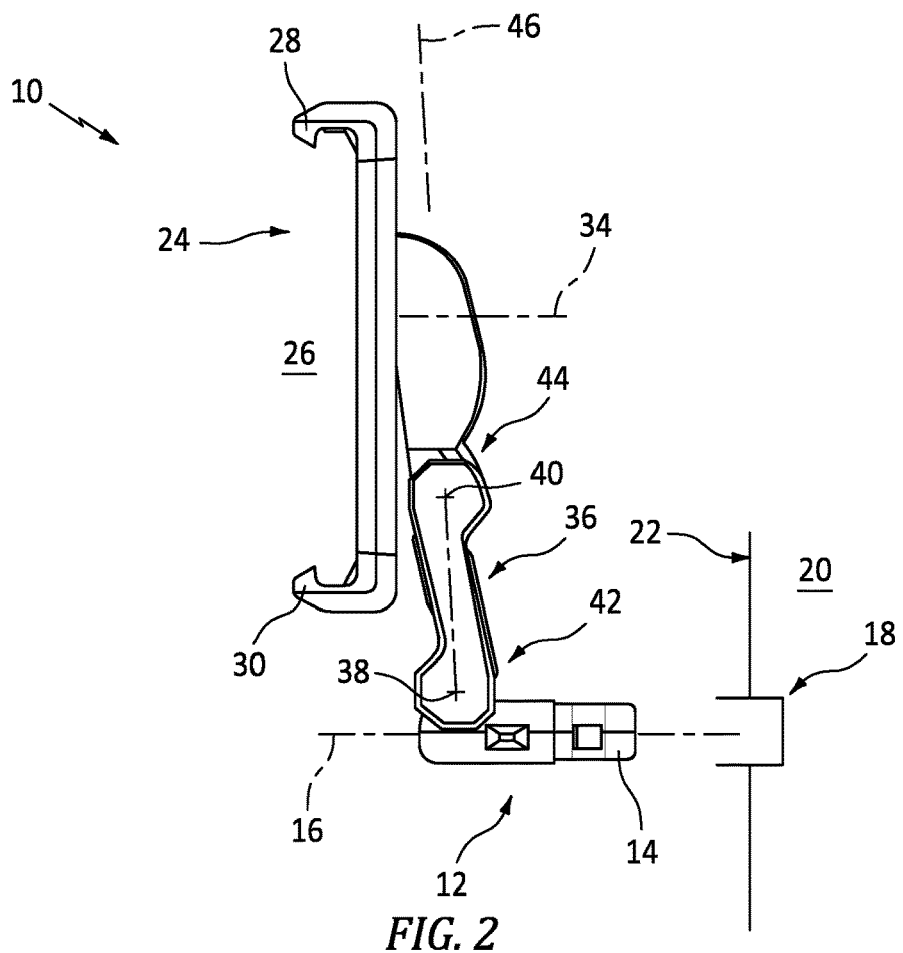
Figure 3:
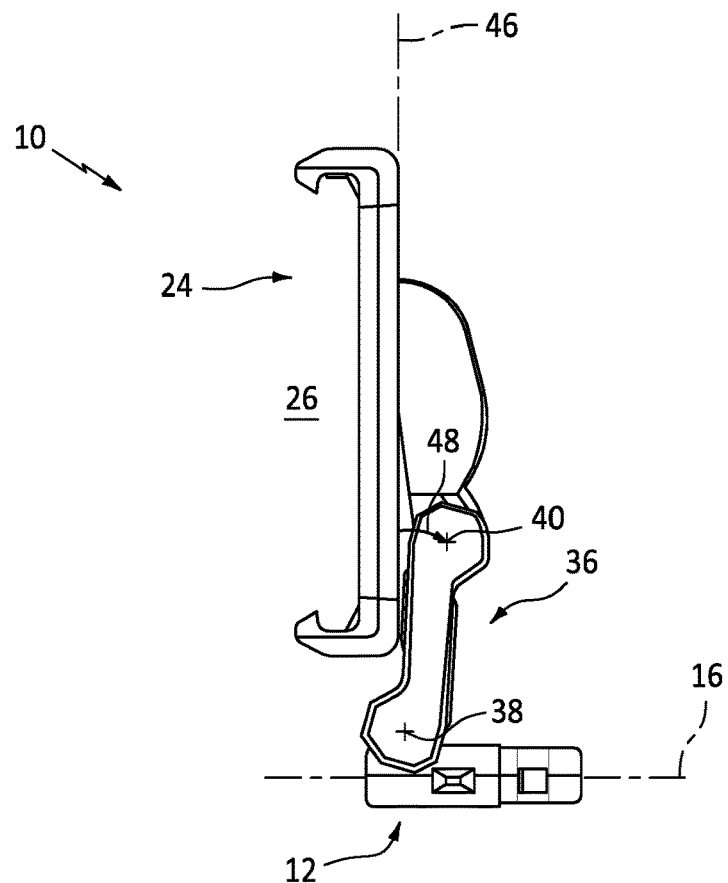
Figure 4:
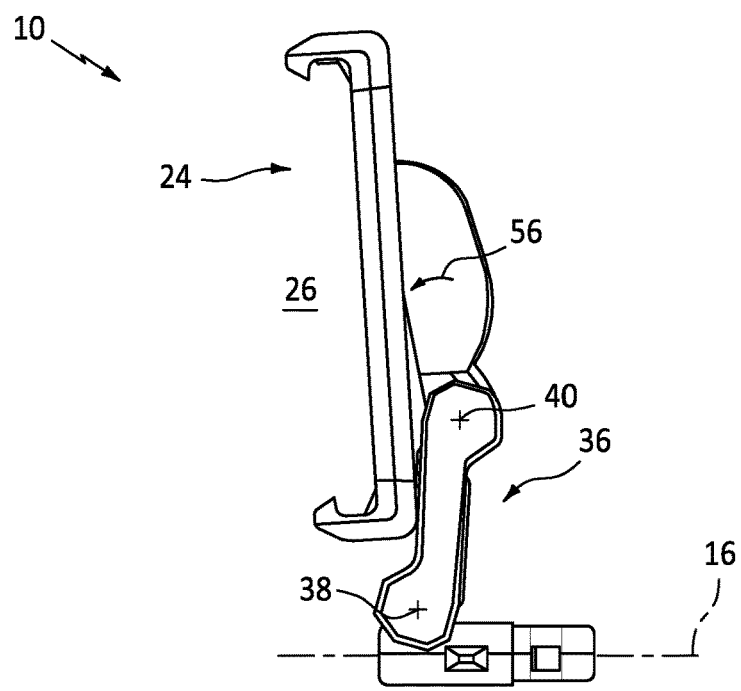
Figure 5:
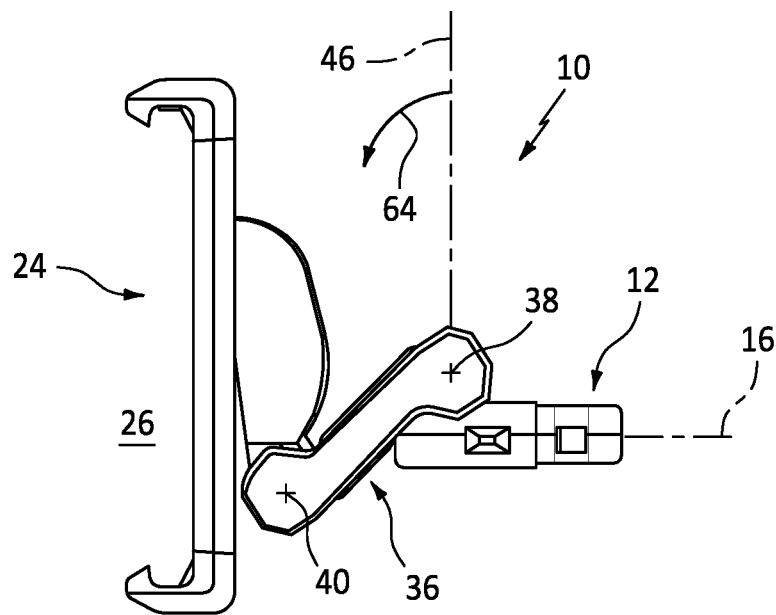
Figure 6:
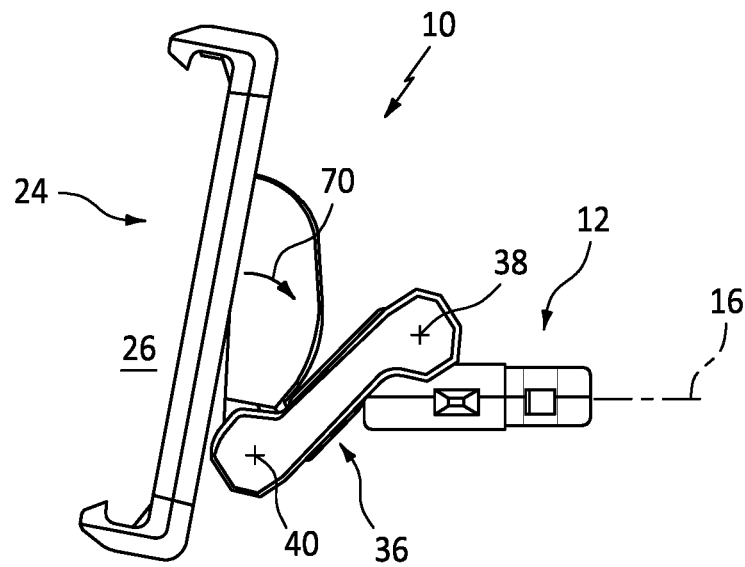
Figure 7:
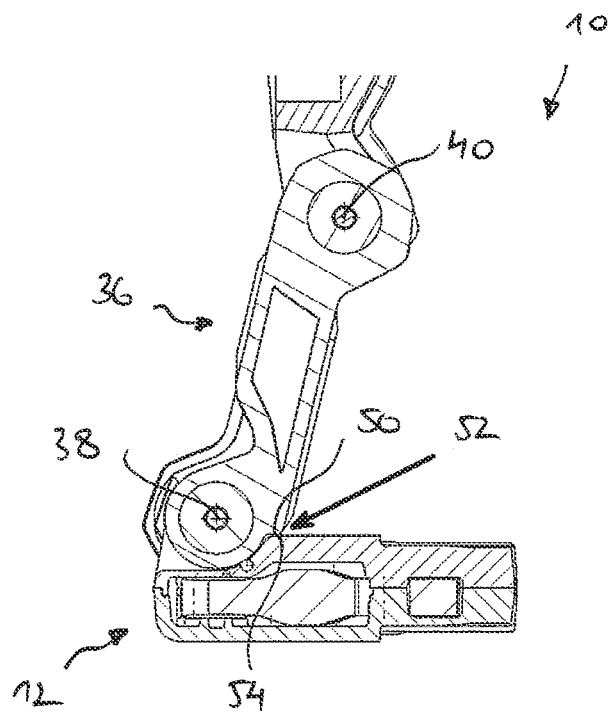
Figure 8:
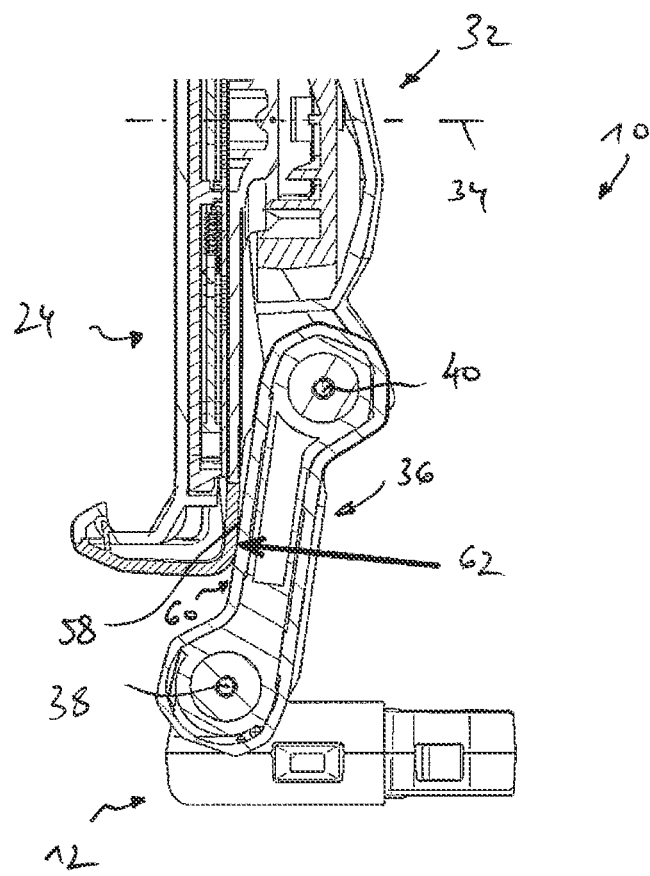
Figure 9:
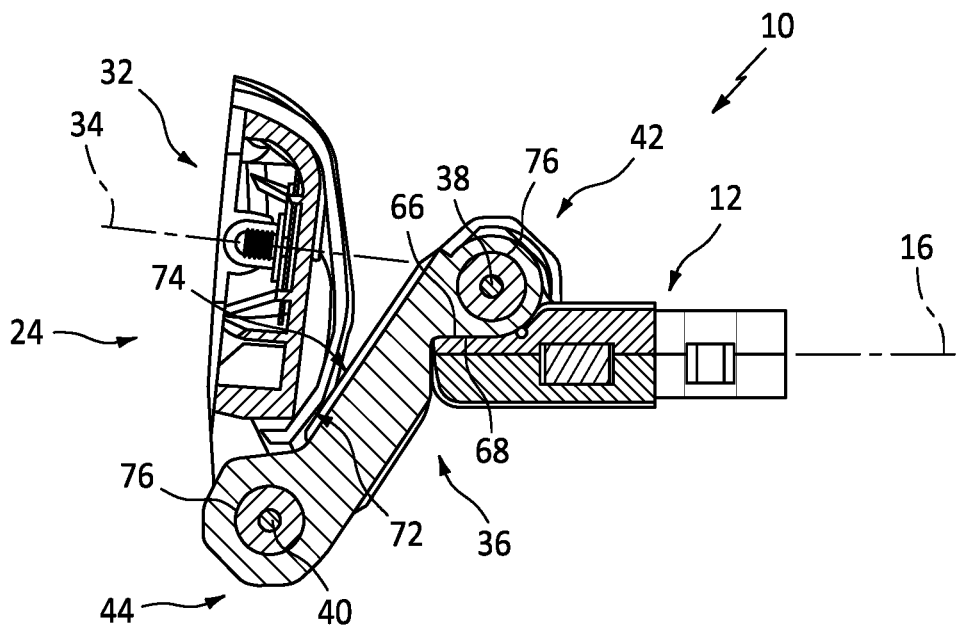
Figure 10:
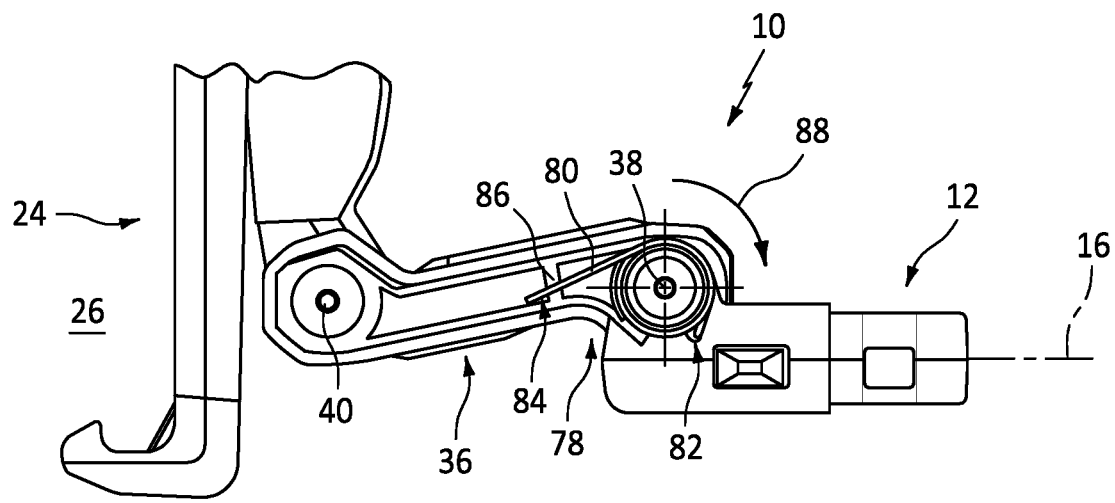

The drawing shows the following:

FIG. 1 a perspective view of an embodiment of a holder;

FIG. 2 a side view of the holder according to FIG. 1, in an initial position in which a coupling element and a holding device are oriented vertically;

FIG. 3 a side view corresponding to FIG. 2, wherein the coupling element assumes a first end position relative to a fastening device;

FIG. 4 a side view corresponding to FIG. 3, wherein the holding device assumes a first end position relative to the coupling element;

FIG. 5 a side view corresponding to FIG. 2, wherein the coupling element assumes a second end position relative to a fastening device;

FIG. 6 a side view corresponding to FIG. 5, wherein the holding device assumes a second end position relative to the coupling element;

FIG. 7 a sectional view corresponding to the first end position of the coupling element according to FIG. 3 and FIG. 4;

FIG. 8 a sectional view corresponding to the first end position of the holding device according to FIG. 4;

FIG. 9 a sectional view corresponding to the second end position of the coupling element according to FIG. 5 and FIG. 6 and to a second end position of the holding device according to FIG. 6; and FIG. 10 a vertical section of a device for applying torque to the coupling element.

In the drawing, a holder as a whole is designated by the reference sign 10. The holder 10 has a fastening device 12 with a plug-in section 14, compare FIG. 2, which extends along a plug-in axis 16 and can be inserted along such plug-in axis 16 into a plug-in receptacle 18 and can be detachably locked there. The plug-in receptacle 18 is arranged on a schematically indicated motor vehicle seat 20, wherein the motor vehicle seat 20 has a rear side 22 facing a vehicle rear compartment.

The holder 10 further comprises a holding device, designated overall by reference numeral 24, which is used for detachably holding an electronic device, in particular a tablet computer or a smartphone.

The holding device 24 has a holding region 26 for arranging the device. When the device is arranged in the holding region 26, it is held between two holding elements 28 and 30 that are spaced apart from one another and are pre-stressed relative to one another when a device is arranged in the holding region 26. Optionally, the holding device 24 comprises a pivot joint 32, compare FIG. 8, to define a pivot axis 34, compare FIGS. 1 and 2, by which the holding region 26 is rotatable about the pivot axis 34, so that a device held on the holding region 26 can be held in an upright or transverse arrangement.

The holding device 24 and the fastening device 12 are connected to one another via a coupling element 36, which can also be of double design, compare reference signs 36a and 36b in FIG. 1.

The coupling element 36 has a first swivel axis 38, by means of which the coupling element 36 can be pivoted relative to the fastening device 12. The coupling element 36 has a second swivel axis 40, by means of which the holding device 24 can be pivoted relative to the coupling element 36.

The swivel axes 38 and 40 are oriented parallel to one another and in particular horizontally. Preferably, the swivel axes 38 and 40 (relative to an extension of the coupling element 36 along a coupling element axis) are maximally spaced apart.

The swivel axes 38 and 40 are part of swivel joints 42 and 44, respectively.

In FIG. 2, the holder 10 is, for example, shown in an initial position, in which the coupling element 36 and the holding device 24 are vertically oriented with the holding region 26. Such vertical position corresponds to a vertical plane 46 shown in FIG. 3, which is oriented perpendicular to the horizontal plug-in axis 16. With respect to the vertical plane 46, the coupling element 36 can be pivoted about the first plug-in axis 38 to a first end position shown in FIG. 3, wherein the coupling element 36 pivots about a first part 48 of a swivel path starting from its initial position in the direction of the motor vehicle seat 20 (compare FIG. 2). A swivel angle allocated to this swivel path 48 is preferably a maximum of 40° and in particular a maximum of 25°.

In the first end position of the coupling element 36, a stop 50 formed on the coupling element 36 abuts a mating surface 54 of the fastening device 12 in a stop region 52, compare FIG. 7.

For the example of the position of the coupling element 36 in the first end position, compare FIGS. 3 and 4, the holding device 24 can be pivoted slightly downward starting from a vertical position about the second swivel axis 40 to a first end position of the holding device 24, compare FIG. 4. A corresponding swivel path 56 of the holding device 24 about the second swivel axis 40 is limited in a first end position of the holding device 24 by the fact that a stop 58 formed on the holding region 24 is in contact with a mating surface 60 of the coupling element 36, so that the further pivoting of the holding region 24 relative to the coupling element 36 is prevented in a stop region 62, compare FIG. 8.

In FIG. 5 as well, the initial position of the coupling element 36 corresponding to FIG. 2, in which it is oriented vertically, is illustrated by means of a vertical plane 46. With respect to this vertical plane 46, the coupling element 36 can be pivoted in a direction opposite to the first part 48 of the swivel path (compare FIG. 3) along a second part 64 of the swivel path about the first swivel axis 38, in particular by a maximum of 135°.

With maximum use of the second part 64 of the swivel path, the coupling element 36 assumes a second end position shown in FIGS. 5 and 6, in which a stop surface 66 of the coupling element 36 is in abutment with a mating surface 68 of the fastening device 12, compare FIG. 9.

Starting from a vertical orientation of the holding device 24 shown in FIG. 5, compare FIG. 5, the holding device 24 can be pivoted about the second swivel axis 40 in a swivel direction 70 in the direction of the rear side 22 of the motor vehicle seat 20, compare FIG. 2, so that the holding region 26 of the holding device 24 is pivoted slightly upward at an angle, which is particularly advantageous for tall users.

The pivoting along the swivel direction 70 is preferably limited up to a second end position of the holding device 24 relative to the coupling element 36 (shown in FIG. 6), in which a stop surface 72 of the holding device 24 is in contact with a mating surface 74 of the coupling element 36, compare FIG. 9.

Thus, the coupling element 36 preferably has a total of four sections that help define one of the aforementioned end positions, if necessary, specifically the stop 50 (compare FIG. 7), the mating surface 60 (compare FIG. 8), the stop surface 66 (compare FIG. 9) and the mating surface 74 (compare FIG. 9). The aforementioned four sections of the coupling element 36 are preferably spatially offset relative to one another and, in particular, are formed by different sections of a circumferential surface of the coupling element 36.

The movement of the coupling element 36 relative to the fastening device 12 about the first swivel axis 38 is preferably self-locking. This also applies to the movement of the holding device 24 about the second swivel axis 40 of the coupling element 36. To realize such a self-locking effect, it is preferred if the swivel joints 42, 44 are designed as friction joints.

For example, the swivel joints 42, 44 have cylindrical friction regions 76, compare FIG. 9, in which a cylindrical outer surface interacts frictionally with a hollow cylindrical inner surface. Plastic materials are preferred for this frictional connection.

In order to enable the easier movement of the coupling element 36 about the first swivel axis 38 relative to the fastening device 12, the holder 10 has a device 78 (shown in FIG. 10). The device 78 comprises, for example, a spring 80 that is supported against the fastening device 12 in a first region 82 and generates a force in a region 84 spaced therefrom, which acts on a force receiving region 86 of the coupling element 36 in order to urge the coupling element 36 about the first swivel axis 38 from a horizontal position—corresponding to a torque direction 88—to a more vertically oriented position.

Accordingly, when a device is arranged in the holding region 26 of the holding device 24, the device 78 serves to receive or compensate for the weight of the device or at least a part of the weight of the device. In the event that the holding region 26 is unoccupied, the device 78 can also serve to move the coupling element 36 to the vertical initial position of the coupling element 36 (compare FIGS. 2, 3 and 5), so that the holding device 24 is arranged in an unactuated initial position close to the motor vehicle seat 20.

The holder 10 enables the holding region 26 to be adjusted in a variety of ways for large and small users in different vehicle environments.

The invention claimed is:

1. A holder (10) for detachably fastening a flat, approximately rectangular device to a motor vehicle seat (20), wherein
    the holder (10) has a fastening device (12) for the detachable plug-in fastening of the holder (10) to a plug-in receptacle (18) allocated to the motor vehicle seat (20), and
    the holder (10) has a holding device (24) for detachably holding the device on the holder (10),
    the fastening device (12) and the holding device (24) are connected to one another via a coupling element (36),
    the coupling element (36) is connected to the fastening device (12) via a first joint and to the holding device (24) via a second joint, wherein the joints are designed as swivel joints with a first swivel joint (42) and a first swivel axis (38) and with a second swivel joint (44) and a second swivel axis (40),
    the first swivel axis (38) and the second swivel axis (40) are oriented parallel to one another, and
    the holder (10) comprises a device (78) for applying a torque to the coupling element (36) about the first swivel axis (38), which torque is effective for erecting the coupling element (36) from a horizontal position to a more vertically oriented position.

2. The holder (10) of claim 1, wherein the first swivel axis (38) and the second swivel axis (40) are oriented horizontally in a position of use of the holder (10).

3. The holder (10) of claim 1, wherein the fastening device (12) has a plug-in section (14) extending along a plug-in axis (16), wherein the plug-in axis (16) is oriented horizontally in a position of use of the holder (10) and in a state inserted into the plug-in receptacle (18).

4. The holder (10) of claim 1, wherein for limiting a first end position of a swivel path of the coupling element (36) relative to the fastening device (12) and/or for limiting a second end position of the swivel path of the coupling element (36) relative to the fastening device (12), the coupling element (36) and the fastening device (12) are in abutment with one another.

5. The holder (10) of claim 1, wherein a swivel angle of the holding device (24) relative to the coupling element (36) is at least 90°.

6. The holder (10) of claim 5, wherein a swivel angle of the holding device (24) relative to the coupling element (36) is at least 120°.

7. The holder (10) of claim 5, wherein a swivel angle of the holding device (24) relative to the coupling element (36) is at least 150°.

8. The holder (10) of claim 1, wherein a swivel angle of the holding device (24) relative to the coupling element (36) is a maximum of 170°.

9. The holder (10) of claim 1, wherein for limiting a first end position of a swivel path of the holding device (24) relative to the coupling element (36) and/or for limiting a second end position of the swivel path of the holding device (24) relative to the coupling element (36), the holding device (24) and the coupling element (36) are in abutment with one another.

10. The holder (10) of claim 1, wherein the first swivel joint (42) and/or the second swivel joint (44) is or are designed as a friction joint(s).

11. The holder (10) of claim 1, wherein the holding device (24) has a pivot joint (32) by means of which a holding region (26) of the holding device (24) is rotatable about a pivot axis (34) that is oriented perpendicular to the second swivel axis (40).

12. The holder (10) of claim 1, wherein the flat, approximately rectangular device is a table computer or a smartphone.

13. A holder (10) for detachably fastening a flat, approximately rectangular device to a motor vehicle seat (20), wherein
- the holder (10) has a fastening device (12) for the detachable plug-in fastening of the holder (10) to a plug-in receptacle (18) allocated to the motor vehicle seat (20),
- the holder (10) has a holding device (24) for detachably holding the device on the holder (10),
- the fastening device (12) and the holding device (24) are connected to one another via a coupling element (36),
- the coupling element (36) is connected to the fastening device (12) via a first joint and to the holding device (24) via a second joint, wherein the joints are designed as swivel joints with a first swivel joint (42) and a first swivel axis (38) and with a second swivel joint (44) and a second swivel axis (40),
- the first swivel axis (38) and the second swivel axis (40) are oriented parallel to one another, and
- a swivel path of the coupling element (36), starting from a vertical orientation (46) of the coupling element (36), is limited:
  - to a first part (48) of the swivel path in the direction of the motor vehicle seat (20) of a maximum of 40°, and/or
  - to an opposite second part (64) of the swivel path of a maximum of 150°.

* * * * *